(12) United States Patent
Pelov et al.

(10) Patent No.: US 11,882,200 B2
(45) Date of Patent: Jan. 23, 2024

(54) METHOD AND APPARATUS PROCESSING OF MESSAGE DATA

(71) Applicant: ACKLIO, Cesson-Sevigne (FR)

(72) Inventors: Alexander Pelov, Cesson-Sevigne (FR); Ana Minaburo, Cesson-Sevigne (FR)

(73) Assignee: ACKLIO, Cesson Sévigné (FR)

( * ) Notice: Subject to any disclaimer, the term of this patent is extended or adjusted under 35 U.S.C. 154(b) by 0 days.

(21) Appl. No.: 16/981,087

(22) PCT Filed: Mar. 15, 2019

(86) PCT No.: PCT/EP2019/056534
§ 371 (c)(1),
(2) Date: Sep. 15, 2020

(87) PCT Pub. No.: WO2019/175378
PCT Pub. Date: Sep. 19, 2019

(65) Prior Publication Data
US 2020/0412841 A1    Dec. 31, 2020

(30) Foreign Application Priority Data

Mar. 16, 2018  (EP) .................................... 18305301
Mar. 16, 2018  (EP) .................................... 18305302

(51) Int. Cl.
*H04L 69/04*    (2022.01)
*H04L 69/22*    (2022.01)
(Continued)

(52) U.S. Cl.
CPC .............. *H04L 69/04* (2013.01); *H04L 69/22* (2013.01); *H04L 41/16* (2013.01); *H04L 45/08* (2013.01)

(58) Field of Classification Search
CPC ......... H04L 69/04; H04L 69/22; H04L 41/16; H04L 45/08; H04W 28/06; H04W 84/18; H04W 4/38
See application file for complete search history.

(56) References Cited

U.S. PATENT DOCUMENTS 6,608,841 B1 *  8/2003  Koodli ...................... H04L 9/40
                                                        341/60
7,974,312 B2 *  7/2011  Ahmadi ................ H04W 28/06
                                                        370/477
(Continued)

FOREIGN PATENT DOCUMENTS

CN       1738284 A      2/2006
CN     101911500 A     12/2010
(Continued)

OTHER PUBLICATIONS

Minaburo, et al., "LPWAN Static Context Header Compression (SCHC) and fragmentation for IPv6 and UDP draft-ietf-lpwan-ipv6-static-context-hc-10", Universitat Politecnica de Catalunya, Feb. 28, 2018.
(Continued)

*Primary Examiner* — Thomas R Cairns
*Assistant Examiner* — Kai Chang
(74) *Attorney, Agent, or Firm* — BakerHostetler

(57) ABSTRACT

In a rule based header compression system such as a SCHC compressor/decompressor, a controller is provided which provides "hints" to the header compression processor, so as to direct its behaviour. These hints may define new rules, modify existing rules, set state values against which rules are tested during compression, prioritise rules or exclude rules from consideration to achieve optimum compression. The controller may dynamically generate rules on the basis of learned of detected flow characteristics to achieve optimum compression. The controller may operate as a state machine,
(Continued)

which may define states corresponding to different degrees of compression for a given flow or flow type. The system comprises multiple compressors, some or all of which may be remote from the compression processor.

15 Claims, 8 Drawing Sheets

(51) Int. Cl.
*H04L 45/02* (2022.01)
*H04L 41/16* (2022.01)

(56) References Cited

U.S. PATENT DOCUMENTS

| | | | |
|---|---|---|---|
| 10,063,674 B2* | 8/2018 | Kwon | H04N 21/435 |
| 10,171,634 B2* | 1/2019 | Ma | H04L 69/04 |
| 2010/0135330 A1* | 6/2010 | Liang | H04L 69/22 |
| | | | 370/477 |
| 2012/0254417 A1 | 10/2012 | Luna | |
| 2013/0028095 A1 | 1/2013 | Vasseur et al. | |
| 2014/0058985 A1* | 2/2014 | Osin | G06N 3/08 |
| | | | 706/12 |
| 2014/0247772 A1* | 9/2014 | Wu | H04L 69/04 |
| | | | 370/328 |
| 2014/0289416 A1 | 9/2014 | Ahuja et al. | |
| 2014/0369365 A1* | 12/2014 | Denio | H04L 69/16 |
| | | | 370/474 |
| 2016/0191466 A1 | 6/2016 | Pernicha | |
| 2017/0052974 A1 | 2/2017 | Zackoski | |
| 2017/0279865 A1* | 9/2017 | Iguchi | H04L 65/611 |
| 2018/0234385 A1* | 8/2018 | O'Neil | H04L 47/2441 |
| 2019/0104075 A1* | 4/2019 | Li | H04L 45/20 |
| 2019/0116521 A1* | 4/2019 | Qiao | H04W 28/06 |
| 2019/0280918 A1* | 9/2019 | Hermoni | H04L 41/0604 |
| 2020/0022022 A1* | 1/2020 | Ly | H04W 28/06 |
| 2021/0058477 A1* | 2/2021 | Keranen | H04W 4/70 |

FOREIGN PATENT DOCUMENTS

| | | |
|---|---|---|
| CN | 103890754 A | 6/2014 |
| CN | 105027122 A | 11/2015 |
| WO | 2013/088323 A2 | 6/2013 |
| WO | 2016/206742 A1 | 12/2016 |

OTHER PUBLICATIONS

"Personal Stateful Firewall Administration Guide", Cisco ASR 5000 Personal Stateful Firewall Administration Guide, Text Part No. OL-24220-01, 2014.

Abdelfadeel, et al., "LSCHC: Layered Static Context Header Compression for LPWANs", Proceedings of the 12th Workshop on Challenged Networks, pp. 13-18, Oct. 20, 2017.

Minaburo, et al., "LPWAN Static Context Header Compression (SCHC) and fragmentation for IPv6 and UDP draft-ietf-lpwan-ipv6-static-context-hc-10", Feb. 28, 2018.

Choi, et al., "Improve IPv6 Global Connectivity for 6LoWPAN", 13th International Conference on Advanced Communication Technology (ICACT2011), 2011.

Indian Examination Report issued in Indian Application No. 202017044669 dated May 4, 2022, with English translation.

English translation of the Notification of the First Office Action issued in Chinese Application No. 201980025237.6 dated Aug. 15, 2022.

European Search Report issued in European Application No. 22160606.4 dated May 30, 2022.

* cited by examiner

Header Processing System

METHOD AND APPARATUS PROCESSING OF MESSAGE DATA

CROSS-REFERENCE TO RELATED APPLICATIONS

This application is a National Stage of International patent application PCT/EP2019/056534, filed on Mar. 15, 2019, which claims priority to foreign European patent application Nos. EP 18305301.6 and EP 18305302.4, filed on Mar. 16, 2018, the disclosures of which are incorporated by reference in their entireties.

FIELD OF THE INVENTION

The present invention relates generally to the processing of data messages, and in particular the compression of such data.

BACKGROUND OF THE INVENTION

FIG. 1 shows schematically aspects of a network header compression mechanism as known in the prior art.

Specifically, FIG. 1 shows elements of a mechanism for header compression for IPv6 networks, substantially as proposed in LPWAN Static Context Header Compression (SCHC) for IPv6 and UDP draft-ietf-lpwan-ipv6-static-context-hc-00

As shown, data are to be transmitted from a transmitting device A to a receiving device B via an IPv6 based LPWAN network 150. Due to limitations such as the power or bandwidth availability at the transmitting device, it may be desirable to reduce the total amount of data to be transmitted. In accordance with the mechanism of FIG. 1, a data packet comprising a number of defined fields for transmission is exposed to a set of Rules 110, 120, 130, 140, which together constitute a context 100*a*. Each Rule comprises a plurality of Field instruction lines. For example, the Rule 140 comprises Field instruction lines 141, 142, 143, 144, 145 etc. The Field Description lines have a common structure comprising four entries. Specifically, each Field Description line comprises a Field ID specifying one of the defined fields of the data packet, a Target Value, a Matching Operator and a Compression/decompression Action. Thus as shown, the Fields of Rule 141 can be seen as structured into four columns 140*a*, 140*b*, 140*c*, 140*d*. Accordingly, Field Description line 141 has a Field ID 141*a*, a Target Value 141*b*, a Matching Operator 141*c* and a Compression/Decompression Action 141*d*. Similarly, Field Description lines 142 have a Field ID 142*a*, a Target Value 142*b*, a Matching Operator 142*c* and a Compression/Decompression Action 142*d*.

In operation, a data packet processed at the transmitter side is compared successively to each Rule, and with each rule successively to each Field Description line of that Rule using a Matching Operator.

For each Field Description line it is determined whether the Target Value entry of the field referenced in the Field ID entry corresponds in a prescribed manner as defined in the Matching Operator entry of that Field Description line. In a case where referenced field corresponds to the Target Value in the prescribed manner for every field in a respective rule, the Compression/Decompression Action of each field in the corresponding rule is applied.

The possible Matching operators include the operators "ignore" or "Equals" MSB (length) and Match-mapping from a list.

By way of example, Rule 140 might comprise the three fields shown below.

| Figure reference | Field ID | Target Value | Matching Operator | Compression Function |
|---|---|---|---|---|
| 141 | F1 | 0x00 | Ignore | not-sent |
| 142 | F2 | 0x1230 | Equal | not-sent |
| 143 | F3 | 0xABC0 | Equal | not-sent |

On this basis, the first field in the data packet would be exposed first to Field instruction line 141, since the method of comparison prescribed in the Matching operator entry for this field is "Ignore", this comparison is automatically satisfied. The method then proceeds to Field instruction line 142, for which the manner of comparison prescribed in the Matching operator entry is "Equal". Accordingly, the field F2 of the data packet must comprise the Target value "0x1230", as defined in the Target Value Field. The method then proceeds to Field instruction line 143, for which the manner of comparison prescribed in the Matching operator entry is "Equal". Accordingly, the field F3 of the data packet must comprise the Target value "0xABC0", as defined in the Target Value Field.

Assuming all three Fields in rule 140 are satisfied on this basis, Rule 140 is selected for application. On this basis, the compression instruction of each field in the rule 140 is applied to the data packet.

As shown above, the compression function for all three Field instruction lines of rule 141 is "not sent", indicating that each of the three fields in question F1, F2 and F3 is stripped from the packet to be transmitted.

As shown in FIG. 1 the compressed packet is then transmitted via the network 150 to the receiving side b, together with an identifier of the Rule 140 that has been applied, ID4.

As shown, a set of Rules 160, 170, 180, 190, corresponding to rules 110, 120, 130 140 as described above respectively together constitute a context 100*b*. The context 100*b* corresponds in structure and content to context 100*a*, so that each Rule comprises a plurality of Field instruction lines. For example, the Rule 190 comprises Field instruction lines 191, 192, 193, 194, 195 etc. The Field instruction lines have a common structure comprising four entries. Specifically, each Field instruction line comprises a Field Reference specifying one of the defined fields of the data packet, a Target Value, a Matching Operator and a Compression/decompression Action. Thus as shown, the Field instruction lines of Rule 191 can be seen as structured into four columns 190*a*, 190*b*, 190*c*, 190*d*. Accordingly, Field instruction line 191 has a Field Reference 191*a*, a Target Value 191*b*, a Matching Parameter 191*c* and a Compression function 191*d*. Similarly, Field instruction lines 192 has a Field Reference 192*a*, a Target Value 192*b*, a Matching Parameter 192*c* and a Compression function 192*d*.

In operation, the received data packet is processed in accordance with the rule specified by the received transmission, that is, Rule ID4, corresponding to Rule 190. Each Field instruction line in the specified rule is applied to the respective field in the prescribed manner.

With reference to a Rule 190 that is identical to rule 140 as presented above, as indicated by the unique rule ID, ID4, the Rule 190 might comprise the three fields shown below.

| Figure reference | Field Reference | Target Value | Matching Operator | Compression Function |
| --- | --- | --- | --- | --- |
| 141 | F1 | 0x00 | Ignore | not-sent |
| 142 | F2 | 0x1230 | Equal | not-sent |
| 143 | F3 | 0xABC0 | Equal | not-sent |

On this basis, the first field F1 in the data packet would be filled with the value 0x00, the second field F2 in the data packet would be filled with the value 0x1230 and the third field F3 in the data packet would be filled with the value 0xABC0.

It may be observed on this basis that the resulting packet 13 is identical to the original packet 11, apart from the value of Field F1, where the original value 0xA1 has been replaced by the value 0x00, by the operation of the "ignore" Matching operator in field 141c. It will be appreciated that in certain cases it may be determined that the value of a particular field can safely default to a predetermined value in this way without interfering with overall system operation.

Compression/Decompression operations defined in the standard mentioned above include the following.

| Function | Compression | Decompression |
| --- | --- | --- |
| not-sent | elided | use value stored in Target Value of the instruction line |
| value-sent | send | build from received value |
| LSB(length) | send LSB | use value stored in Target Value of the instruction line value OR received value |
| compute-IPv6-length | elided | compute IPv6 length |
| compute-UDP-length | elided | compute UDP length |
| compute-UDP-checksum | elided | compute UDP checksum |
| ESiid-DID | elided | build IID from L2 ES address |
| LAiid-DID | elided | build IID from L2 LA address |

Mechanisms such as that described with reference to FIG. 1 provide a basis for reducing the data flow in networks, nevertheless as the number of devices using such communications systems grows, and the capacities of end devices are subject to ever stricter limitations in terms of power consumption, processing power and communications bandwidth, it is desirable to provide mechanisms for further optimizing such communications.

SUMMARY OF THE INVENTION

In accordance with the present invention in a first aspect there is provided a header processing system comprising a context memory storing a plurality of rules, each rule comprising one or more field instructions, each field instructions comprising a target value and a processing instruction;
   a header compression processor adapted to determine for each rule whether a respective specified region of a data message corresponds to the target value in a respective prescribed manner, and in a case where the respective specified region corresponds to the target value in the respective prescribed manner for each field instruction line in a respective rule, applying the processing instruction of each field instruction line in the corresponding rule with regard to the respective specified region, wherein the data component processed is defined by the processing instruction,
the system further comprising a controller, the controller being adapted to assess a processing context, and to provide one or more instructions defining the operation of the header compression processor as a function of the processing context.

In a development of the first aspect, one or more instructions are provided to the processor, and wherein the one or more instructions define priorities determining the sequence in which the header compression processor determines for each rule whether a respective specified region of a data message corresponds to the target value in a respective prescribed manner, as a function of the processing context.

In a development of the first aspect, the instruction to the processor defining priorities disallows one or more rules from the process of determining.

In a development of the first aspect, controller is adapted to provide one or more instructions to the context memory to modify the content thereof.

In a development of the first aspect the controller is adapted to generate a new rule, and to provide one or more instructions to the context memory to modify the content thereof by adding the new rule thereto.

In a development of the first aspect, controller is adapted to modify a rule by modifying the target value or field instruction line of the rule in the context memory.

In a development of the first aspect, the controller is adapted to generate the one or more instructions to the context memory to modify the content thereof with regard to historical content of the data message, where the new or modified rule provides a compression operation optimized for the historical content.

In a development of the first aspect, the system further comprises a state memory, wherein one or more rules have regard to a value stored in the state memory, and wherein one or more instructions are provided to the state memory to set the value.

In a development of the first aspect, the system further comprises a dispatcher, the dispatcher receiving the output of the header compression processor for onward transmission.

In a development of the first aspect, the dispatcher receives an instruction from the controller, the controller being further adapted to cause the dispatcher to transmit a rule or element thereof.

In a development of the first aspect, the dispatcher is further adapted to provide feedback to the controller.

In a development of the first aspect, the feedback comprises the length of each compressed message output by the header compression processor.

In a development of the first aspect, the system further comprises a plurality of controllers as defined in any preceding claim.

In accordance with the present invention in a second aspect there is provided a method of header processing, in a system comprising a context memory storing a plurality of rules, each rule comprising one or more field instructions, each field instructions comprising a target value and a processing instruction;
   a header compression processor adapted to determine for each rule whether a respective specified region of a data message corresponds to the target value in a respective prescribed manner, and in a case where the respective specified region corresponds to the target value in the respective prescribed manner for each field instruction line in a respective rule, applying the processing instruction of each field instruction line in the corresponding rule with regard to the respective specified region, wherein the data component processed is defined by the processing instruction, The method comprises assessing a processing context,
providing one or more instructions defining the operation of the header compression processor as a function of the processing context, and
performing one or more header compression operations in accordance with the instruction.

In accordance with the present invention in a third aspect there is provided a computer program comprising instructions adapted to implement the steps of the second aspect.

In accordance with the present invention in a fourth aspect there is provided a computer readable medium incorporating the computer program the steps of the third aspect.

BRIEF DESCRIPTION OF THE DRAWINGS

The above and other advantages of the present invention will now be described with reference to the accompanying drawings, for illustration purposes only, in which.

DETAILED DESCRIPTION

Figure 2:
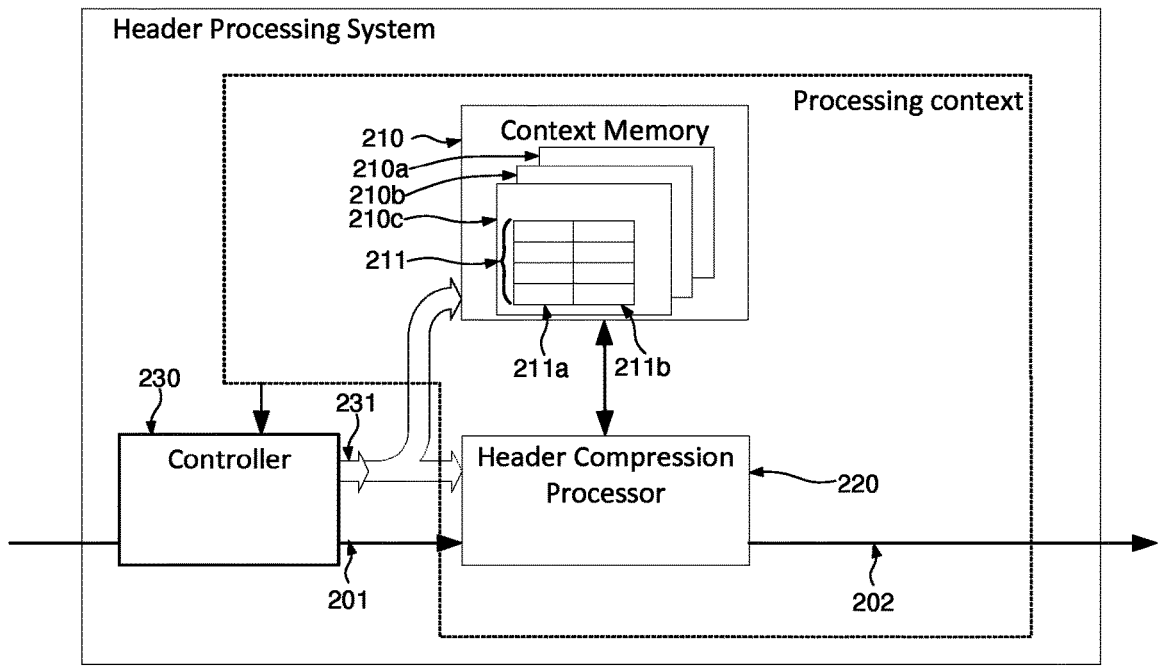
FIG. 2 shows a header processing system in accordance with an embodiment.

FIG. 2 shows a header processing system in accordance with an embodiment. As shown, there is provided a context memory 210 storing a plurality of rules 210a, 210b, 210c, each rule 210a, 210b, 210c comprising one or more field instructions 211. Each field instruction comprising a target value 211a and a processing instruction 211b. There is further provided a header compression processor 220 adapted to determine with respect to a received data message 201 for each rule whether a respective specified region of the data message corresponds to the target value in a respective prescribed manner, and in a case where the respective specified region corresponds to the target value in that respective prescribed manner for each field instruction line in the respective rule, to apply the processing instruction of each field instruction line in the corresponding rule with regard to the respective specified region, wherein the data component processed is defined by the processing instruction.

Figure 1:
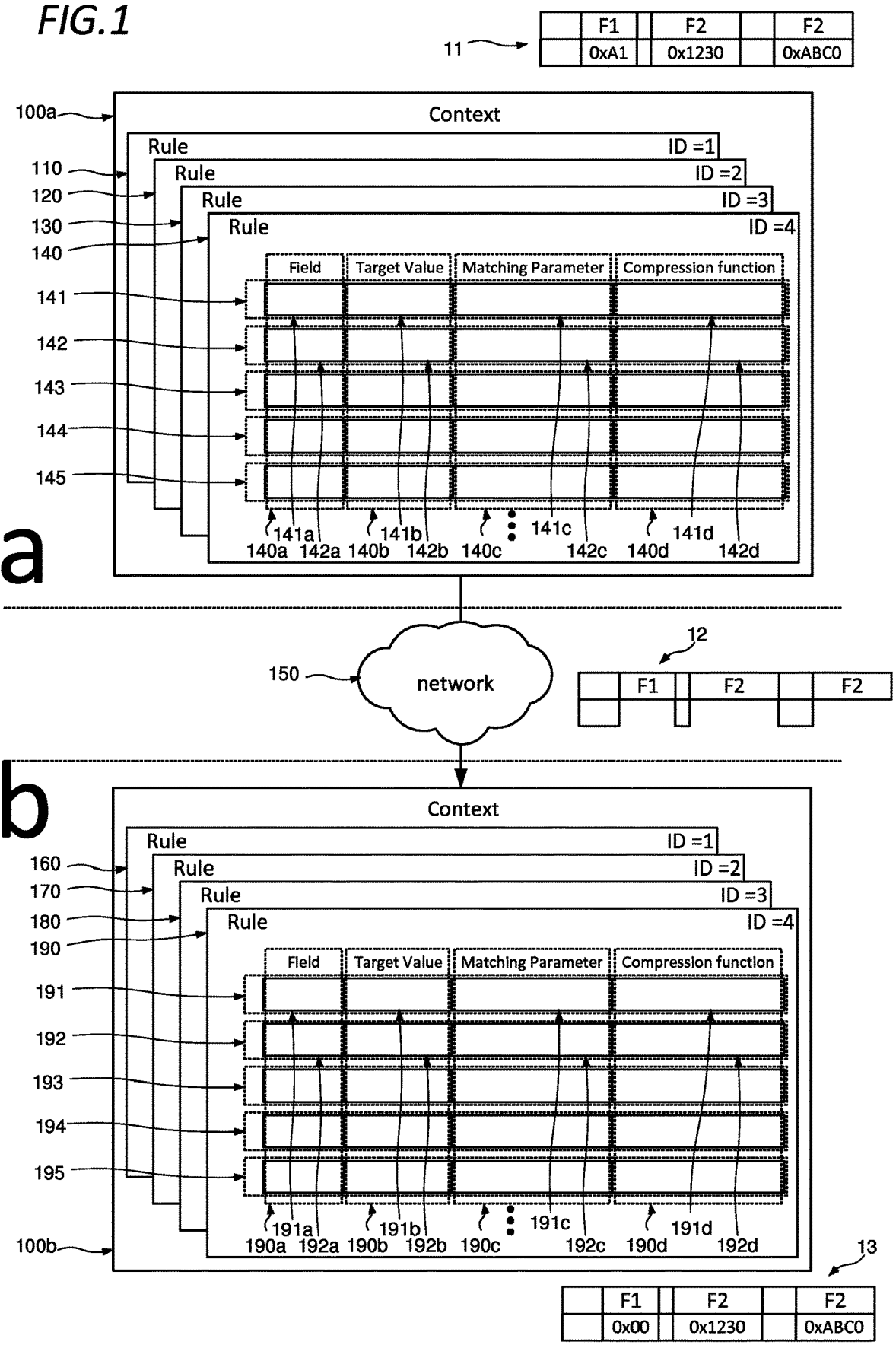
FIG. 1 shows schematically aspects of a network header compression mechanism as known in the prior art.

Accordingly, a mechanism such as described with respect to FIG. 1 is one example of a possible basis of such an implementation.

As shown in FIG. 2 meanwhile, the system further comprises a controller 230. As shown, the controller receives the flow of input data messages, which as shown passes on to the Header compression processor 220. It will be appreciated that while in the present embodiment the controller is shown as receiving the stream of arriving data messages, and passing these on to the header compression processor, that in other embodiments this need not be the case—embodiments may be envisaged in which the controller 230 operates without access to the data stream—certain such embodiments will be presented hereafter.

The controller 230 is adapted to assess the processing context, and to provide one or more instructions 231 defining the operation of the header compression processor as a function of the processing context. The processing context considered by the compression processor may include any available data relevant to the operation of the header compression processor. It may include the rules stored in the context memory; it may also comprise the current or historical content of the data flow. It may also comprise information concerning the status of local or remote devices (processor load, temperature, available memory, remaining battery charge and so on), local or remote device requirements (processing capacity, protocols handled, number of connected devices and so on) network traffic conditions, and any other datum that may conceivably be of use in determining an optimal format for the outgoing data message 202 prepared by the header compression processor. The context may include the Rule ID which identifies each Rule in the context memory; it may also contain the metadata information of the SCHC functionalities (header compression and fragmentation), it may contain reliability information of the link, for example the duty cycle, FEC messages, mtu, number of packets (one, stream, multiple), references values, delta value, entropy, type of device, application, etc.

As mentioned above, the controller is adapted to provide one or more instructions defining the operation of the header compression processor as a function of the processing context. As will be illustrated with regard to further embodiments below, it will be appreciated that although these instructions may be issued to the header compression processor directly, this need not be the case as there other ways of defining the operation of the header compression processor.

As shown in FIG. 2, the instructions 231 are shown to proceed optionally to the header compression processor 220, and/or to the context memory.

In certain implementations, one or more instructions may be provided to the header compression processor. These instructions may define priorities determining the sequence in which the header compression processor determines for each rule whether a respective specified region of a data message corresponds to the target value in a respective prescribed manner, as a function of the processing context.

It will be appreciated that in arrangements such as that described with reference to FIG. 1, the sequence in which rules are considered may have a significant impact on the operation of the header compression processor. For example, multiple rules may be satisfied for a particular data message, and where this occurs it may typically be the first applicable rule to be identified that is adopted. On this basis, by changing the sequence in which rules are considered, one rule may be adopted in preference to another. Taking this further, a set of related rules may be reordered to define a hierarchy in order of preference, with the preferred option in a particular context being positioned earliest in the sequence. For example, two rules may be defined, one defining a high degree of compression with a significant overhead, the other a lower level of compression, but no overhead. A particular data message may be processable by either approach, and as such may satisfy either rule. In accordance with the present embodiment, the controller may determine that the data message belongs to a short burst, for which a low overhead approach is more applicable, and on this basis may instruct the Header Compression Processor to consider that rule first. In this example the context considered by the controller would thus include information concerning the expected characteristics of the stream. These might be inferred from the type of device emitting the signal, learned from historic behaviour or otherwise. In any case, it will be appreciated that such considerations are outside the scope of the conventional rule based approach of FIG. 1, and demonstrate the additional intelligence and flexibility enabled by the operation of the controller. This might be achieved for example by reference to a rule identifier, for by specifying the start point in the set of rules, or by providing a complete set of identifiers to be considered in sequence, or otherwise.

By the same token, it will be appreciated that this or other approaches may have an effect of the instruction to the processor defining priorities effectively disallowing one or more rules from the process of determining. For example, since a context will typically include a broad catch-all rule which will apply where no other rule is satisfied, putting a rule that might otherwise have been satisfied in a sequence after such a catch-all rule means that the later rule will never be found to apply, and is thus effectively disallowed.

The controller may transmit instructions, for example to the compression processor, by inserting the relevant data into the stream which it passes on, or by a parallel communication path, as desired.

As mentioned above, an instruction 231 issued by the controller may additionally or alternatively be directed to the context memory 210. In this case, the instruction may be designed to cause the modification of the content of the context memory.

In certain embodiments, the controller may be adapted to generate a new rule, and to provide one or more instructions 231 to the context memory 210 to modify the content thereof by adding the new rule to the context memory. The controller may generate the rule from scratch, for example on the basis of a rule template, or may generate the new rule from a depository of predefined rules. In a similar vein to the approach described above concerning instruction being issued to the header compression processor, new rules may be generated dynamically by the controller in reaction to changes in the overall context, and in particular on the basis of characteristics of the incoming message stream. For example, if the controller determines that the available compression rules in the context memory are not well suited to the characteristics of the incoming stream, it may generate additional rules able to provide processing optimally tailored to those characteristics.

The Controller analyses the information of the packets and it may decide to create a new Rule. The controller needs to be sure both correspondents (compressor and decompressor) have the new Rule, or in any case that the decompressor has a rule suitable for decompressing code compression in accordance with the new rule. If the compressor/decompressor is linked to the controller locally or directly, it may write directly to its context memory, for example using a free Rule ID and it may create a file description with the information of TV, MO and CDA for each field of the header etc. When the compressor/decompressor is not directly linked to the controller, but needs to have the information, the controller may send an instruction telling it to create a rule ID X where X is the number it has used for the local part and the way it has to manage to get the TV, MO and CDA for the fields. It may not necessarily send a complete field description, but may send merely instructions as to how suitable values may be obtained.

On this basis, the controller may be adapted to generate the one or more instructions to the context memory to modify the content thereof with regard to historical content of the data message, where the new or modified rule provides a compression operation optimized for the historical content. The system may additionally comprise a buffer associated with the controller to enable the controller to access such historical information.

In other embodiments, the instruction may cause the contents of the context memory 210 to modify a rule by modifying the target value or field instruction line of the rule in the context memory. In a similar vein to the preceding example, existing rules defined in the context memory 210 may be modified by the controller in reaction to changes in the overall context, and in particular on the basis of characteristics of the incoming message stream. For example, if the controller determines that the available compression rules in the context memory are not well suited to the characteristics of the incoming stream, it may identify the most appropriate existing rule, and determine how that rule may be adapted to better handle those characteristics. In particular, the controller is adapted to modify a rule by modifying the target value or field instruction line of the rule in the context memory.

In other embodiments, the controller may be adapted to modify a rule by deleting it from the context memory 210.

It will be appreciated that the controller may issue instructions adding, deleting or amending rules in the context memory, and any combination of these operations. In some cases, a single instruction may implement more than one of these operations, for example a new rule may replace an existing one, so that a single instruction adds a new rule, and deletes the existing one.

It will be appreciated that the controller may issue instructions to the header compression processor, or the context memory, or both. For example, the controller may modify a rule in the context memory, and issue an instruction to the processor giving priority to the amended rule.

Figure 3:
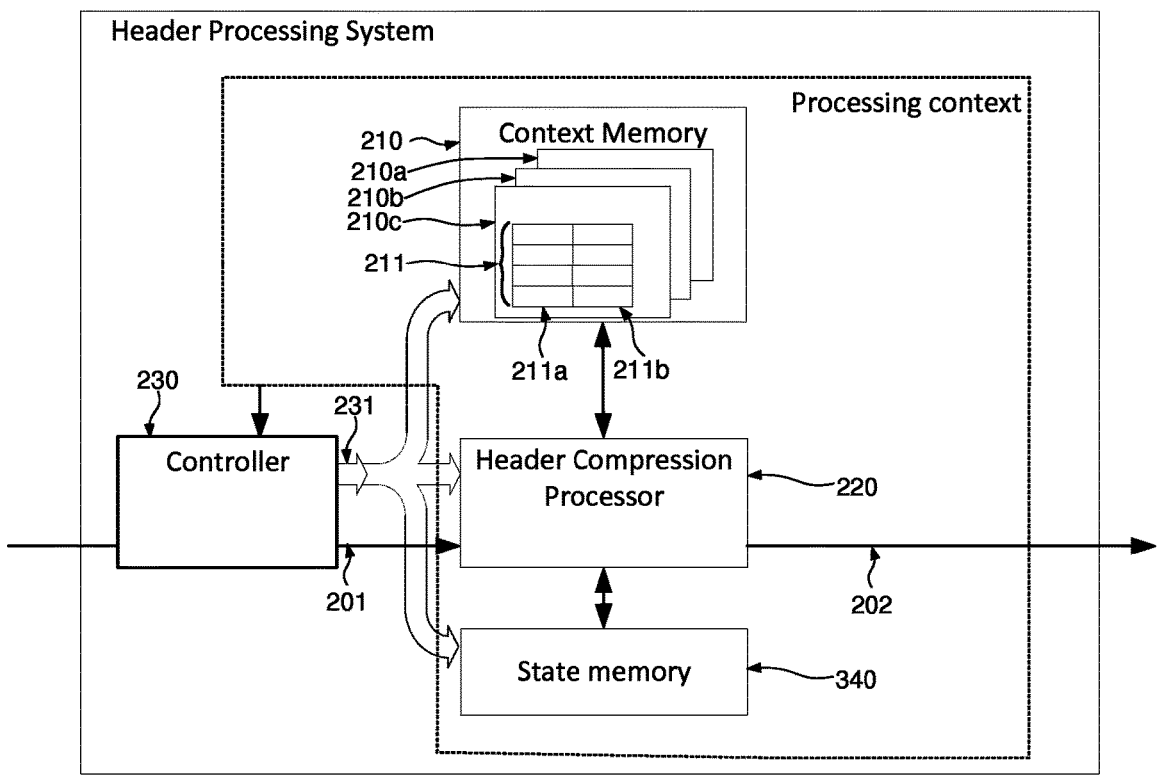
FIG. 3 shows a header processing system in accordance with a further embodiment.

FIG. 3 shows a header processing system in accordance with a further embodiment. As shown, there is provided a context memory 210, header compression processor 220 and controller 230, substantially as described with reference to FIG. 2. As shown, the system further comprises a state memory 340.

One or more of the rules 210a, 210b, 210c stored in the context memory 210 may have regard to a value stored in the state memory. That is to say, for example, the target value of one or more field instructions of the rule may be defined wholly or partially in terms of a value stored in the state memory. Any aspect of one or more field instructions of the rule may similarly be defined wholly or partially in terms of a value stored in the state memory.

In accordance with embodiments such as that of FIG. 3, one or more instructions 231 may be issued by the controller 230 to the state memory 340 to set the respective value. As such, the arrangement of FIG. 3 provides an additional mechanism whereby the controller 230 may define the operation of the header compression processor as a function of the processing context.

It will be appreciated that the controller may issue instructions to the header compression processor, or the context memory, or the state memory, or any combination of these. For example, the controller might modify a rule in the context memory, and also modify a value in the state memory to which the modified rule refers.

Optionally, the processing context considered by the controller 230 may also incorporate the state memory. The state memory may support other operations of the header compression processor.

Figure 4:
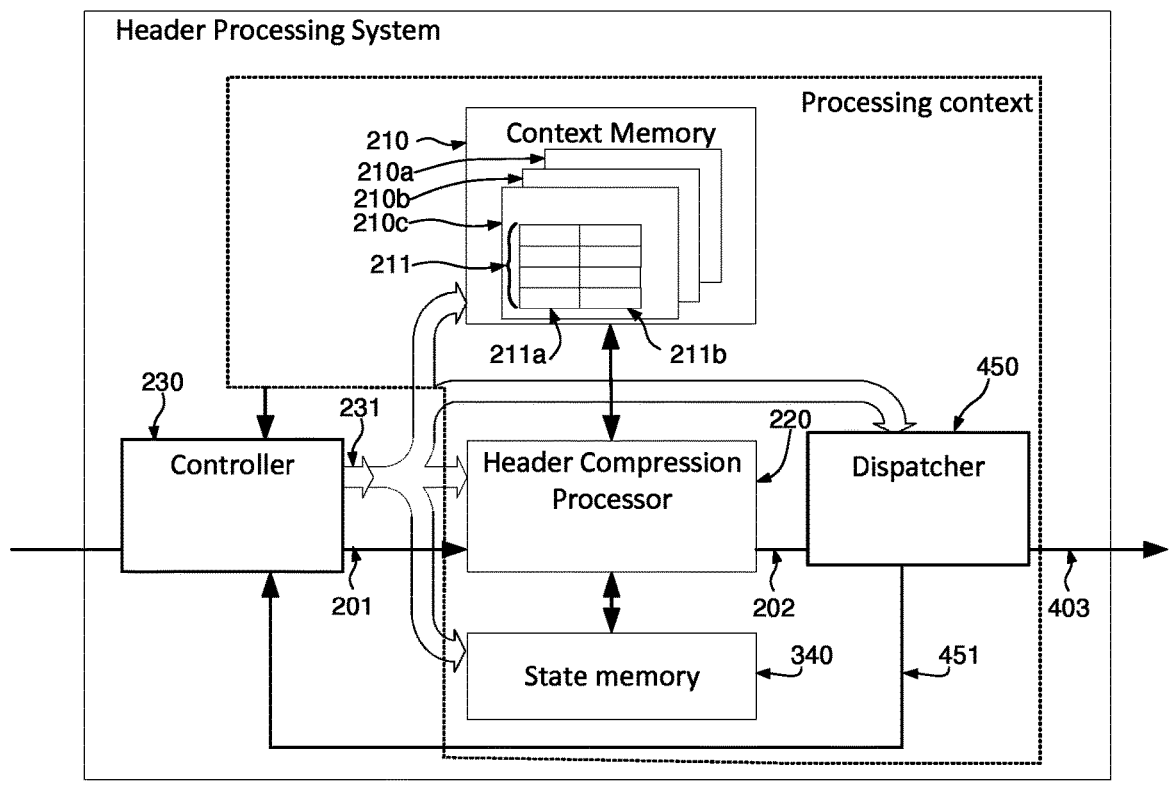
FIG. 4 shows a header processing system in accordance with a further embodiment.

FIG. 4 shows a header processing system in accordance with a further embodiment. As shown, there is provided a context memory 210, header compression processor 220 and controller 230, substantially as described with reference to FIG. 2, and a state memory 340 as described with reference to FIG. 3. As shown, the system further comprises a dispatcher 450. The dispatcher 450 receives the output of the header compression processor for onward transmission.

In accordance with certain embodiments, the dispatcher 450 may be further adapted to provide feedback to the controller 230, as indicated schematically by the arrow 451. This feedback may comprise for example the length of each compressed message output by the header compression processor, link conditions such as: error rate, delay, duty cycle and so on. The controller 230 may use this feedback to assess the effectiveness of the current rules 210a, 210b, 210c in the context memory 210, and thereby the need for modified rules as described above, or whether particular rules should be prioritised over other as described above. On this basis, the controller 230 might experimentally modify or prioritise rules, and assess the results on the basis of feedback from the dispatcher, in order to optimise the rules. In certain embodiments the dispatcher can send FEC messages for reliability for example.

The controller may transmit instructions, for example to the compression processor or dispatcher, by inserting the relevant data into the stream which it passes on, or by a parallel communication path, as desired.

The dispatcher may transmit instructions, for example to the compression processor e.g. in the corresponding device, by inserting the relevant data into the stream which it passes on, or by a parallel communication path, as desired. The dispatcher may send the instructions after compression/fragmentation and it can piggyback the instructions in order to send only one packet over the network L2.

Since as described above the controller may insert messages into the datastream, which may be compressed and transmitted, the controller may communicate with components of a remote device, for example the controller, compression processor, context memory or state memory of that remote device, without the dispatcher being present.

In accordance with certain embodiments, the dispatcher may be coupled to receive an instruction from the controller 230. The controller 230 may be further adapted to provide an instruction to the dispatcher to transmit a rule or element thereof. Since compression mechanisms such as that described with reference to FIG. 1 depend on the fact that the rules described in the context at the decompressor correspond to those at the compressor, in cases where the rules are modified as described above, it may be necessary to correspondingly update those in the communicating device. e.g., if the header processing system embodying the invention is performing a compression operation, the device containing the header processing system performing the corresponding decompression may need to update its context. It will be appreciated that this may imply that the communicating device may also comprise a header processing system in accordance with an embodiment.

The arrangement of FIG. 4 shows the dispatcher in combination with the State memory. It will be appreciated that other embodiments may comprise the dispatcher but not the state memory.

It will be appreciated that the controller may issue instructions to the header compression processor, or the context memory, or the state memory, or the dispatcher, or any combination of these. For example, the controller may modify a rule in the context memory, and issue an instruction to the dispatcher to forward the new rule to the corresponding device.

Figure 5:
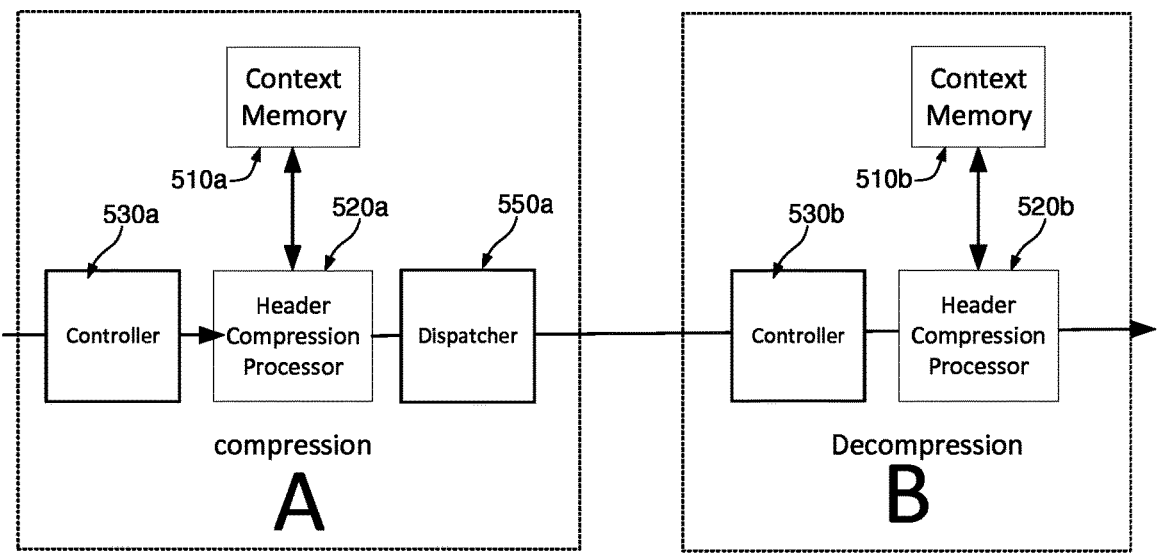
FIG. 5 shows an arrangement comprising a compressor and decompressor in accordance with certain embodiments.

FIG. 5 shows an arrangement comprising a compressor and decompressor in accordance with certain embodiments.

As described with respect to FIG. 4, it may be desirable for corresponding devices to communicate concerning their compression/decompression operations. For example, as described above, it may be desirable when a rule is modified, to make a corresponding modification in the corresponding device.

As shown in FIG. 5 there is provided a first device A at which compression occurs, and a second device B at which the stream compressed by device A is decompressed. As shown, the first device A is similar to that of FIG. 4, and comprises a context memory 510a, header compression processor 520a, controller 530a, and dispatcher 550a. Meanwhile, the second device B comprises context memory 510b, header compression processor 520b and controller 530b. As described with reference to FIG. 4, the dispatcher 550a may be instructed by the controller 530a to transmit information to the device B. For example, if the controller 530a modifies the rules in context memory 510a, it may be necessary for corresponding modifications to be made to the context memory 510b for the compressed stream to be properly decompressed. The relevant information such as the new rule may be transmitted over the communication channel together with the data stream, and received and decoded by the controller 530b. The controller 530b may then make appropriate changes in device B, e.g. by causing a corresponding modification to the context memory 510. Similar considerations may apply in the case of a change of the sequence in which rules are considered at each side, although this may not always be necessary since correct, even if sub-optimal decompression should be possible in the event of different sequences.

With reference to FIG. 5, it may be appreciated that a head processing system in accordance with certain embodiments may be seen as extending outside a particular device. The controller 510a may be seen as a secondary controller in device B (the primary controller being 530b).

As a further development, bidirectional communications between devices A and B may be possible. Where this is the case, the primary controller of either device may initiate changes (modify rules, change rule processing sequences, update state memory, etc.) locally, and then transmit instructions to the other device so as to cause corresponding changes at the other end. In this way, each controller is a primary controller for the device to which it belongs, and a secondary controller for its corresponding device.

It may also be envisaged that a particular device may not have a local controller, but that controller functions may be provided entirely by a remote controller, either belonging to the corresponding device, or indeed remote from both devices.

As such, the controller in a header processing system in accordance with certain embodiments may be remote from the compression processor of that system.

Furthermore, in view of the preceding discussion, it will be clear that a header processing system in accordance with certain embodiments may comprise a plurality of controllers. As discussed, no, one, or more controllers may belong to the device in which the header processing system is located, no, one, or more controllers may be located in the corresponding device, and no, one, or more controllers may be located remotely from both devices, so long as at least one controller is provided.

Figure 6:
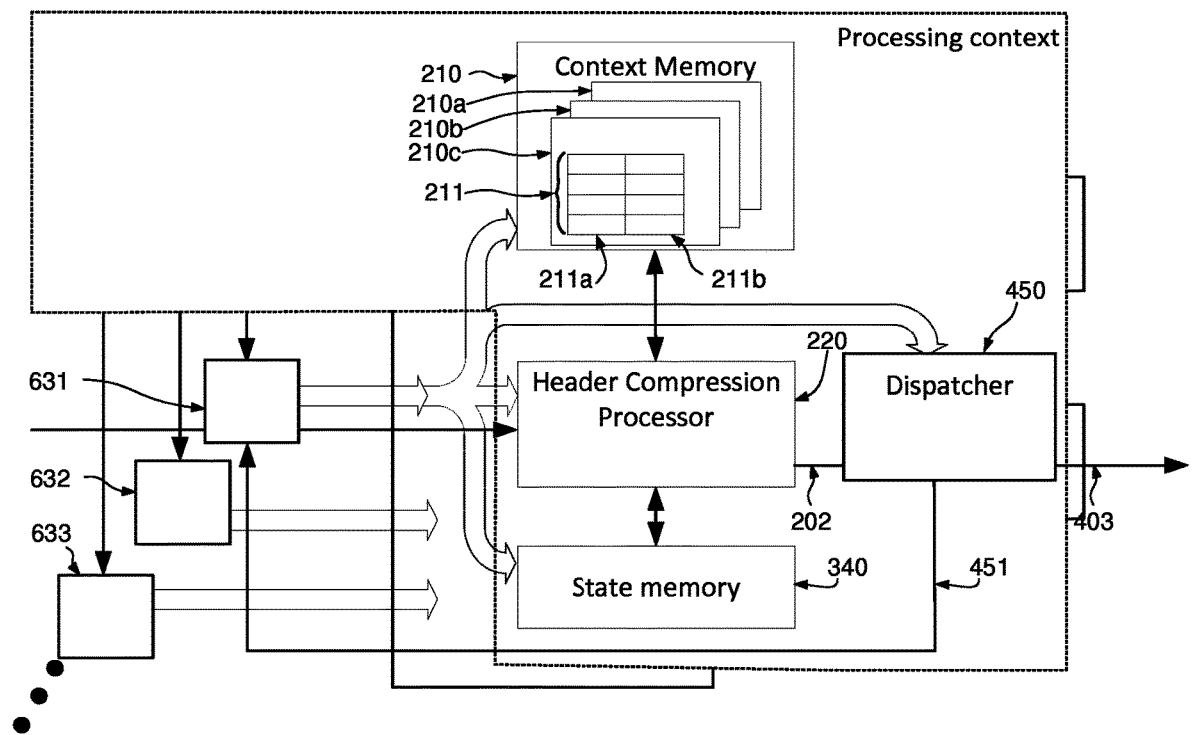
FIG. 6 shows header processing system with multiple controllers in accordance with an embodiment.

FIG. 6 shows header processing system with multiple controllers in accordance with an embodiment.

As shown in FIG. 6, there is provided a context memory 210, header compression processor 220, state memory 340 and dispatcher 450 substantially as described with reference to FIG. 4. As shown, the system comprises a first controller 631, and second controller 632 and a third controller 633. Any number of further controllers may be provided on this basis.

As shown the first controller 631 receives the incoming data stream, and forwards this to the header compression processor 220, in the same way as controller 230 as described above. Meanwhile, controllers 632 and 633 are shown as receiving context information (which may be the same for each controller, or differ partially or wholly for each controller), and may issue instructions to the context memory, state memory, header compression processor or dispatcher either directly, or via the primary controller 631, as described above. On this basis, the second and third controllers 632, 633 may be remote controllers, for example belonging to the corresponding device or remotely from both devices.

Use cases based on the foregoing embodiments will now be considered in further detail.

A general objective of the logic of the controller may be to bring about the transmission of minimal information in order to maximize the use of bandwidth. So, the compression will be based on sending the fewest bits that will allow the decompressor to build the original header.

In the current example, the controller may receive the following packet from network level 2.

60 OD 31 30 02 96 11 40 FE 80 00 00 00 00 00 00 00
00 00 35 37 33 30 FE 80 00 00 00 00 00 00 00 00
00 65 38 37 65 13 39 AD 9C 02 96 7A 3D 80 15 00 EB
64 45 BC 46 3D 49 38 6B 00 16 12 05 . . . .

The controller knows the format of an IP packet, and in particular that if the first byte is 6x then the packet is an IPv6 packet, and if it is 4x then the packet is a IPv4 packet. In the present example, since the first byte is 60, the controller can determine that the received packet is an IPv6 packet.

The Controller knows the format of IPv6 packet.

Figure 7:
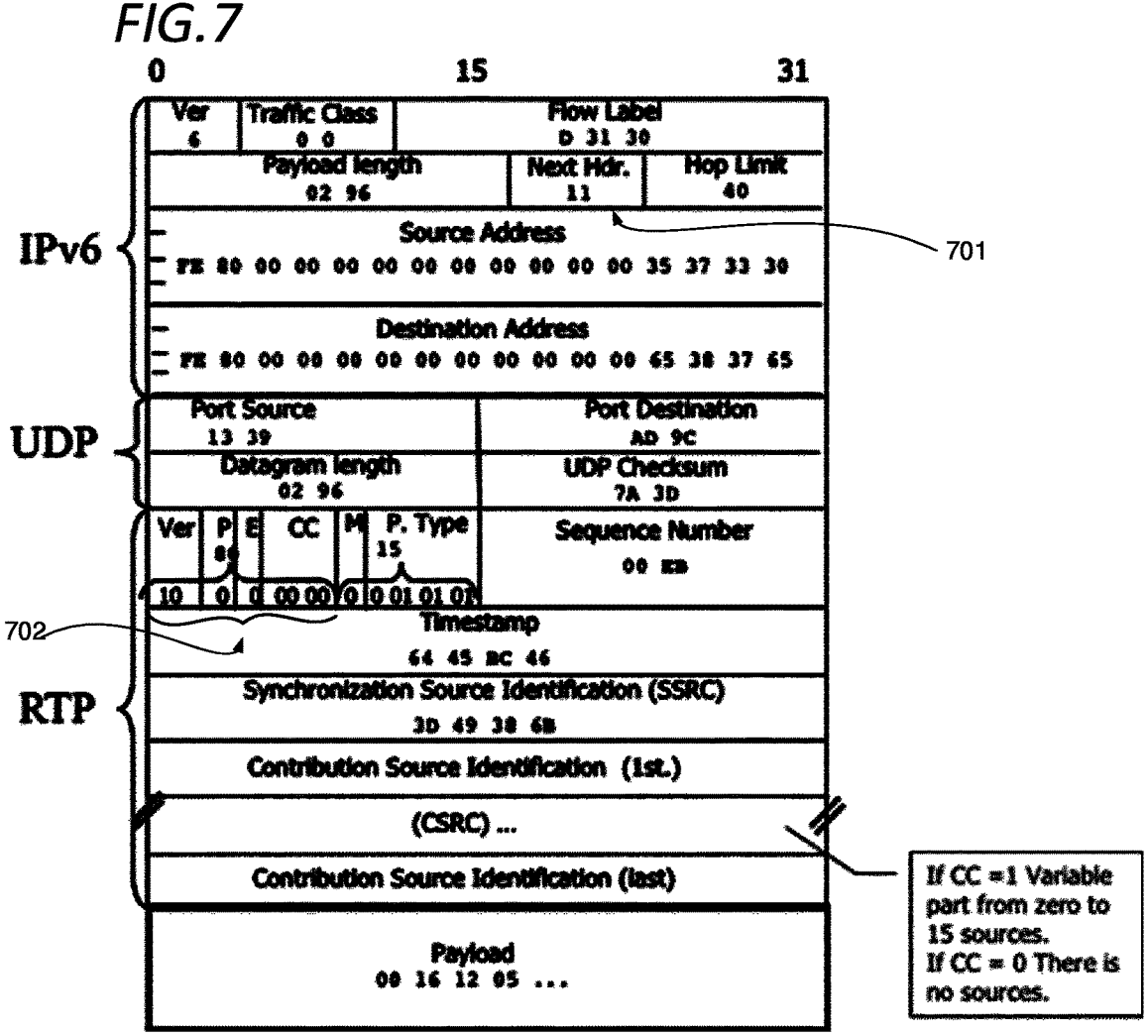
FIG. 7 shows the format of an IPv6 Packet.

FIG. 7 shows the format of an IPv6 Packet. As shown in FIG. 7, there is a field 701 called Next Header, which specifies the protocol of the next layer. As shown, the value of field 701 in this example is 11 which indicates the UDP protocol.

Now the controller knows that the received packet is an IPv6/UDP packet, but for streaming in this example the controller needs to look for the next layer and see if there is RTP protocol. In this case, this may be determined by looking for the first byte following the end of the UDP header, with the knowledge that a RTP frame always starts with 80. Since the IPv6 header is 40 bytes and the UDP is 8 bytes, the controller refers to the $49^{th}$ byte 702 to see if it is 80.

Since this is the case as shown, the controller determines that the received packet is an RTP packet. The controller may assume there will be more packets belonging to this stream.

A packet belonging to a given stream will have the same: source IP address and destination IP address, source UDP/TCP ports and destination UDP/TCP ports, Payload Type (P. Type) and the Synchronization Source Identification (SSRC). The controller may thus check each packet in the flow, in order to consider compression in the context of the flow.

When the controller identifies a first packet belonging to a flow, in this case RTP, the controller may record the values of: Sequence Number, Timestamp, SSRC, and CSRC when they are present for comparison with future packets.

For the purposes of the present example, once a flow has been detected, a series of packets may be received as follows:

| Field | Packet1 | Packet2 | Packet3 | Packet4 | Packet5 | Packet6 |
|---|---|---|---|---|---|---|
| Field1 sequence number | 10 | 11 | 12 | 13 | 14 | 15 |
| Field2 IPv4 header fragmentation offset | 5 | 10 | 15 | 20 | 25 | 30 |
| Field3 timestamp | 75500 | 75530 | 75560 | 75590 | 75620 | 75650 |

Field 2 is an offset field of IP header with a jumping value +5, and Field 3 is a Timestamp.

The controller may at this time create a Rule using an empty Rule ID plus the information of the header or assess which existing Rules should be used to compress the header information. The controller defines a Group of rules comprising the selected Rules IDs and can send this information as an instruction to the compression processor 220 as described above.

As further packets in the same flow are received, the controller can establish reference values. The controller may look at the rules in the context memory to determine whether any applicable rules are defined, e.g. in the present example if there are corresponding rules referencing Most Significant Bit or Delta values for the fields in question (Sequence Number, Timestamp, etc.). If no applicable Rule is defined, the controller may create a Rule based on these reference values with the information of the header. These new rules might be designated Group 2.

As further packets arrive, the controller is confident about the correlation of these values. The controller must probably know how the Sequence Number is varying, and can if possible correlate the values of the Timestamp with the values of the Sequence Number in order to create a function to compute the real value. The controller may continue to look for applicable rules in the context memory, and create new Rules as necessary, which may be designated as Group 3.

As the flow continues, the controller may seek to achieve progressively increased Compression by defining rules using other Matching Operator values such as Delta MSB or a group for updating the values in the memory with reducing the compression; or after packet lost establish again the correlation.

Once groups of rules have been defined, for example as described above and loaded into the context memory, the controller may conveniently selectively activate one or more of these groups by means of an instruction as described above. For example, when the controller needs to use only the Rules of Group 1, the controller may disable all the Rules except the ones that belong to the Group needed for performs the compression. This may be seen as creating a new context with the Rules belonging to this Group. The instruction may be used to tell the compressor/decompressor which Rules are in the Group.

Examples of fields that can be compressed in this way include IPv4 offset, RTP Sequence Number and Timestamp, and more generally any field having dependency and varying with a regular factor, and others.

When the controller creates a Rule, it may take a Rule ID which is not current used in the context memory, and create the description of the fields with its corresponding TV, MO and CDA.

Figure 8:
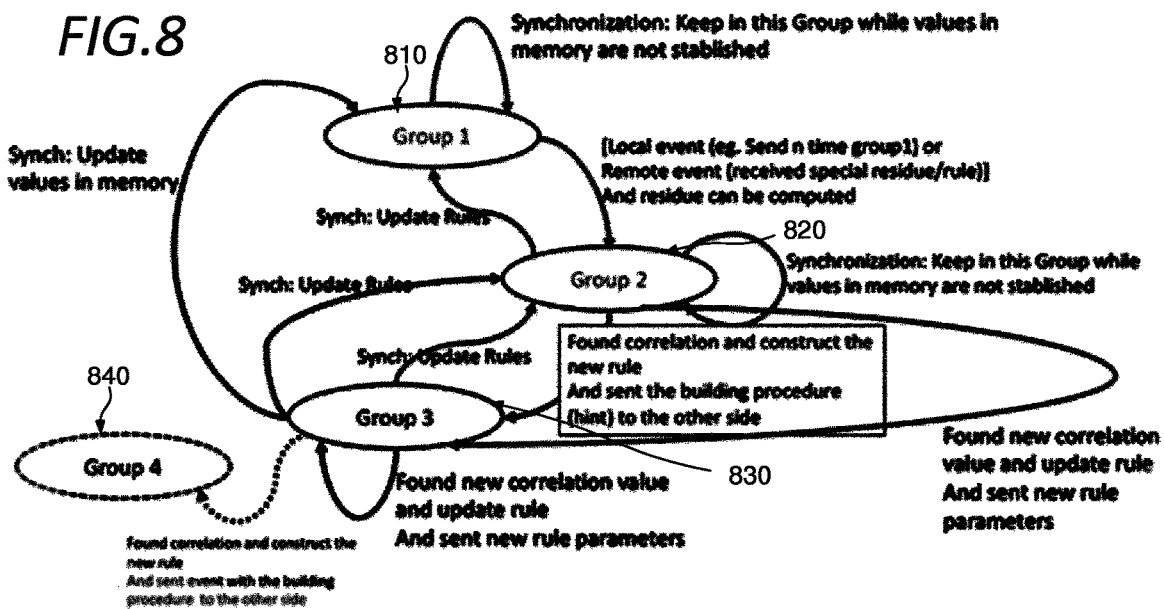
FIG. 8 shows a State Machine as may be implemented by the controller 230.

In the present example, if the controller receives the packet of FIG. 8, and determines that there is not rule currently defined for RTP packets, it might modifies a Rule that may be used for the IP/UDP part or creates a new one by putting each field of the header in order of appearance in the header and with the corresponding TV, MO and CDA values.

By way of example, if no rule 12 is presently defined, or if a rule 12 is defined but not used in its present form, and on this basis the controller may define a new claim 12 appropriate the current flow as follows. For Group 1 as presented above, that is, the most generic class of Rules in the context memory, a rule may be defined as follows:

| RULE 12 Field ID | Target Value | Matching Operator | CDF |
| --- | --- | --- | --- |
| version | 6 | Equal | Not-sent |
| DiffServ | 00 | Equal | Not-sent |
| Flow Label | 00000 | Equal | Not-sent |
| Length | | Ignore | Compute-length |
| Next Header | 11 | Equal | Not-sent |
| Hop Limit | 40 | Equal | Not-sent |
| ES Prefix | FE 80 00 00 00 00 00 00 | Equal | Not-sent |
| ES IID | 00 00 00 00 35 37 33 30 | Equal | Not-sent |
| LA Prefix | FE 80 00 00 00 00 00 00 | Equal | Not-sent |
| LA IID | 00 00 00 00 65 38 37 65 | Equal | Not-sent |
| ES port | 13 39 | MSB(12) | LSB |
| LA port | AD 9C | MSB(12) | LSB |
| Length | | Ignore | Compute-length |
| Checksum | | Ignore | Compute-checksum |
| Version | 10 | Equal | Not-Sent |
| Padding | 0 | Equal | Not-Sent |
| Extension | 0 | Equal | Not-Sent |
| CSRC Count | 00 00 | Equal | Not-Sent |
| Marker | 0 | Ignore | Sent |
| Payload Type | 0 01 01 01 | Equal | Not-Sent |
| Seq. Num | 00 EB | Ignore | Sent |
| Timestamp | 64 45 BC 46 | Ignore | Sent |
| SSRC | 3D 49 38 6B | Equal | Not-Sent |
| CSRC | | Ignore | Not-Sent |

While the rules in the present example assume the basic form presented with reference to FIG. 1 above for example for the sake of simplicity, It will be appreciated that other rule structures supporting more sophisticated operations may be defined without departing from the general principles of the present invention.

When the controller comes to consider a new level of optimisation, for example Group 2 rules as discussed above, a new Rule 101 might be defined as follows:

| RULE 101 | Target Value | Matching Operator | CDF |
| --- | --- | --- | --- |
| version | 6 | Equal | Not-sent |
| DiffServ | 00 | Equal | Not-sent |
| Flow Label | 00000 | Equal | Not-sent |
| Length | | Ignore | Compute-length |
| Next Header | 11 | Equal | Not-sent |
| Hop Limit | 40 | Equal | Not-sent |
| ES Prefix | FE 80 00 00 00 00 00 00 | Equal | Not-sent |
| ES IID | 00 00 00 00 35 37 33 30 | Equal | Not-sent |
| LA Prefix | FE 80 00 00 00 00 00 00 | Equal | Not-sent |
| LA IID | 00 00 00 00 65 38 37 65 | Equal | Not-sent |
| ES port | 13 39 | MSB(12) | LSB |
| LA port | AD 9C | MSB(12) | LSB |
| Length | | Ignore | Compute-length |
| Checksum | | Ignore | Compute-checksum |
| Version | 10 | Equal | Not-Sent |
| Padding | 0 | Equal | Not-Sent |
| Extension | 0 | Equal | Not-Sent |
| CSRC Count | 00 00 | Equal | Not-Sent |
| Marker | 0 | Ignore | Sent |
| Payload Type | 0 01 01 01 | Equal | Not-Sent |
| Seq. Num | 00 EB | MSB(14) | LSB |
| Timestamp | 64 45 BC 46 | MSB(28) | Sent |
| SSRC | 3D 49 38 6B | Equal | Not-Sent |
| CSRC | | Ignore | Not-Sent |

It may be seen that while the Group 1 rule and Group 2 rule are similar in conception, the Group 2 is more specific in terms of its Matching Operators, and sends less data, achieving higher compression. Specifically, the Group 2 rule only applies for specified Sequence Number ranges and Timestamp values, and while in Group 1 rule the Sequence Number and Timestamp values are transmitted, in the Group 2 rule, only the Least Significant Bit of the Sequence Number is transmitted.

When the controller comes to consider a still further level of optimisation, for example Group 3 rules as discussed above, a new Rule 122 might be defined as follows:

In this case, the controller identifies a correlation and creates a new Rule 122 to compute the dependent fields. In this example Timestamp depends on Sequence Number and the Timestamp description is a function of Sequence Number.

| RULE 122 | Target Value | Matching Operator | CDF |
| --- | --- | --- | --- |
| Version | 6 | Equal | Not-sent |
| DiffServ | 00 | Equal | Not-sent |
| Flow Label | 00000 | Equal | Not-sent |
| Length | | Ignore | Compute-length |
| Next Header | 11 | Equal | Not-sent |
| Hop Limit | 40 | Equal | Not-sent |
| ES Prefix | FE 80 00 00 00 00 00 00 | Equal | Not-sent |
| ES IID | 00 00 00 00 35 37 33 30 | Equal | Not-sent |
| LA Prefix | FE 80 00 00 00 00 00 00 | Equal | Not-sent |
| LA IID | 00 00 00 00 65 38 37 65 | Equal | Not-sent |
| ES port | 13 39 | MSB(12) | LSB |
| LA port | AD 9C | MSB(12) | LSB |
| Length | | Ignore | Compute-length |
| Checksum | | Ignore | Compute-checksum |

-continued

| RULE 122 | Target Value | Matching Operator | CDF |
|---|---|---|---|
| Version | 10 | Equal | Not-Sent |
| Padding | 0 | Equal | Not-Sent |
| Extension | 0 | Equal | Not-Sent |
| CSRC Count | 00 00 | Equal | Not-Sent |
| Marker | 0 | Ignore | Sent |
| Payload Type | 0 01 01 01 | Equal | Not-Sent |
| Seq. Num | 00 EB | Ignore | Sent-Delta |
| Timestamp | $V_{ref}V_{sam}$*Sent-Delta (SN) | Ignore | Not-Sent |
| SSRC | 3D 49 38 6B | Equal | Not-Sent |
| CSRC | | Ignore | Not-Sent |

As such, the controller may implement pattern identifying or correlation logic, and dynamically generate rules on the basis of a pattern detected in a sequence of packets so as to optimise compression of further packets reflecting the detected pattern. Sequence Number and/or Timestamp may provide a convenient basis for identifying correlations in data streams. The offset of the IP address and the QoS fields may be particularly helpful in IPv4 streams. IP addresses are likely to be relevant for IPv4 o4 IPv6 streams generally.

As such, the controller may implement intelligent behaviors, so as to analyze data and create and/or select the Rules to be used for compression of different applications. This may be implemented as a State machine, or other Artificial Intelligence machine (based for example on a neural network) or a state machine evolving according with what has to be compressed.

In the present example, when the first RTP packet arrives at the Controller the controller may not know anything about the values on the flow. At the beginning, the controller uses a general Rule (i.e. rule 12 defined above) to compress the first packets. The number of packets processed under these initial conditions may be as few as one. The number of packets processed on this basis may depend on the link error, delay, duty cycle, reliability, etc. This phase may allow the controller to create flow reference values in memory as discussed above.

For the following packets, the controller sends only the LSB because he has a reference value to compute the original one. At the end of this phase, the controller has the information about the behaviour of the values on the fields. The controller needs some packets to know how the Timestamp varies, two packets is not enough, the controller needs to use this group more than once to be sure to have the correct values in the memory in order to compute a function that correlates both values.

When the controller is confident about the values and the "function" it has found, it can create Group 3 or next Group with this information and so, the controller can compress the header by only sending the delta of the sequence number.

It will be appreciated that while in the present example the controller defines rules at three successive levels of optimisation, any arbitrary number of levels of optimisation may be defined. Furthermore, although in the present example the successive levels converge on a higher degree of compression, as conditions change the controller may revert to lower levels of compression.

Once rules are defined the Controller can at any time issue an instruction to specify that one or more of these groups be used preferentially as described above.

While analysis is done, the Controller may aim to decide which group of Rules the Header Compression Processor will use to perform compression/fragmentation. It may not be able decide which Rule if this would cause a change in the compression behavior, for example as a SCHC implementation. Accordingly, to leave the header compression processor itself unchanged the controller may merely enable a specified Rule or Rules that the controller knows can perform the header compression.

So, the Controller will manage the Rules in the context by groups, in order to allow/disallow some of these groups while SCHC performs compression/decompression.

On this basis, the operation of the controller may be depicted as a state machine.

FIG. 8 shows a State Machine as may be implemented by the controller 230. As shown in FIG. 8, there are defined four states 810, 820, 830, 840. Each state represents a group of Rules as discussed above and as may be defined in the context memory 210. In continuation of the preceding example, state 810 may correspond to the Group 1 rules e.g. rule 12 above, state 820 may correspond to the Group 2 rules e.g. rule 101 above, and state 830 may correspond to the group 3 rules e.g. rule 122 above. State 840 may correspond to some further set of rules as may be created or selected as conditions evolve or further flow correlations are determined. The decision of which group of Rules 810, 820, 830, 840 is to be used for any given received packet is determined by the operation of the controller. The controller performs its analysis on a context as described above, which in this example may compress the current values of the header packet, the values kept in memory for the previous packet and any rules previously specified by the controller.

In the beginning of the present example, the context memory 210 may contain groups 810 and 820 that may be used by the header compression processor 220 in processing a received packet.

As compression proceeds the controller may decide to use one or another of alternative groups of Rules 830, 840 to improve compression, so controller create this new group and sends an instruction to the other side.

As compression proceeds the controller in general terms will attempt to correlate the different values of the changing fields compared to the one that changes sequentially in order to only send this compressed value. But different strategies may be used to create a new group of Rules.

Specifically, as shown state 810 loops back on itself in a case of synchronization where the controller determines that Group 1 should remain active while the reference values for assessment of subsequent packets are not stably determined. When the controller determines that a particular event has occurred, such as receiving a defined number of packets, or receiving an external instruction, such as from an external (auxiliary) controller, the machine proceeds to state 820 at which group 2 is activated. State 820 loops back on itself in a case of synchronization where the controller determines that Group 2 should remain active while the reference values for assessment of subsequent packets are not stably determined. The state machine may revert to state 810 from state 820 in a case where the controller determines that the Rules of Group 2 are no longer applicable. When the controller determines that a correlation has been identified in the packets received in the current state permitting the creation of an improved group of rules, the machine proceeds to state 830 at which group 3 is created, distributed to the corresponding device as necessary, and activated locally. State 830 loops back on itself in a case a new correlation value is identified, whereupon the group of rules is updated (local and in the corresponding device if necessary). The state machine may revert to state 820 from state 830 in a case where the controller determines that the Rules of Group 3 are no longer applicable. When the controller determines that a particular event has occurred, such as receiving a defined number of packets, or receiving an external instruction, such as from an external (auxiliary) controller, the machine proceeds to state 820 at which group 2 is activated. State 820 loops back on itself in a case of synchronization where the controller determines that Group 2 should remain active while the reference values for assessment of subsequent packets are not stably determined. The state machine may revert to state 810 from state 830 in a case where the controller determines that the reference values in memory are no longer applicable. When the controller determines that a further, or alternative correlation has been identified in the packets received in the current state permitting the creation of a further improved group of rules, the machine proceeds to state 840 at which group 3 is created, distributed to the corresponding device as necessary, and activated locally. The skilled person will appreciate that any number of further states may be defined in continuation of this approach, for example as described above.

Accordingly the system may further comprise a controller adapted to assess a processing context, and to provide one or more instructions defining the operation of said header compression processor as a function of the processing context.

As such, the controller may implement a state machine. The state machine may comprise states whereby the machine moves between states on the basis of the assessment of the processing context. The states of the state machine may correspond to respective groups of rules, such that said controller provides one or more instructions defining the operation of the header compression processor with regard to the groups of rules corresponding to the current state of said state machine. The states of the state machine may comprise a plurality of states corresponding to successive degrees of compression for a give data stream type. The state machine may progress through said plurality of states corresponding to successive degrees of compression as the number of packets received of a particular data stream type increases.

In a continuation of the preceding example, with respect to an exemplary data stream, the Field1 is a sequence number of 4 bits, so the values go from 0 to 15 and wraparound. Field2 is an offset field of IP header with a jumping value +5, and Field 3 is a Timestamp.

| Field | Packet1 | ... | Packet15 | Packet16 | Packet17 | Packet18 | Packet19 |
|---|---|---|---|---|---|---|---|
| Field1 sequence number | 0 | ... | 14 | 15 | 0 | 1 | 2 |
| Field2 IPv6 header fragmentation offset | 5 | ... | 70 | 75 | 80 | 85 | 90 |
| Field3 timestamp | 75500 | ... | 75950 | 75980 | 76010 | 76030 | 76060 |

Using the state machine of FIG. 8. the controller State Machine may instruct the use Group4 up to packet 16.

When the Controller receives Packet17, the Controller will detect that the existing rules are rendered inapplicable in view of the Sequence Number wrap-around, and will need to readapt the compression values of the sequence number in the defined rules in order to enable to proper compression/decompression of these values. Accordingly, the state machine goes to the initial state where Rules belonging to the first group are used, the correlation of the windows is not possible anymore and the values of Field2 and Field3 must be sent (either MSB (Group_2) or without compression Group_3).

In a further continuation of the preceding example, with respect to an exemplary data stream, the following packets might be received.

| Field | Packet1 | ... | Packet15 | Packet16 | Packet17 | Packet18 | Packet19 |
|---|---|---|---|---|---|---|---|
| Field1 sequence number | 0 | ... | 14 | 15 | 0 | 1 | 2 |
| Field2 IPv6 header fragmentation offset | 5 | ... | 70 | 75 | 80 | 85 | 90 |
| Field3 timestamp | 75500 | ... | 75950 | 88000 | 88120 | 88240 | 88360 |

Referring again to FIG. 8, the controller detects on receiving packet 17 that the delta for successive time stamp values has changed, for example due to an improvement in channel conditions leading to an increase in video transmission quality, with a new timestamp increment. Accordingly the memory state needs to be set again, so the instruction "Use Group_1" Is issued, so that the reference values are updated in memory.

The Controller can also create another group based on error or updating requirements. In this case a Group 4 or further group is created while doing compression, the controller can determine that there is a need to update the values because there is a wraparound in SN or that the reference value is too far from the actual compressed value and to give a better compression it can update the references values in the memory. So instead of breaking all the correlation it has done, it can update the SN by creating a new group of Rules allowing the updating of the memory but keeping the correlation of the SN-Timestamp.

All the groups are linked so the Controller can go forward/backwards to the groups depending on what has been received and the memory values.

The Controller may also analyse the evolution of a field in the uncompressed header and define new sets of rules more adapted to the actual transmission.

The Controller may synchronize these new sets of rules with the corresponding device using a dedicated Rule. This rule may send the context or modified part thereof, or instructions to recreate the context or modified part thereof, or merely avoid compression that would interfere with the transmission of such information, for example which applies no compression FIG. 9 shows a method in accordance with an embodiment.

Figure 9:
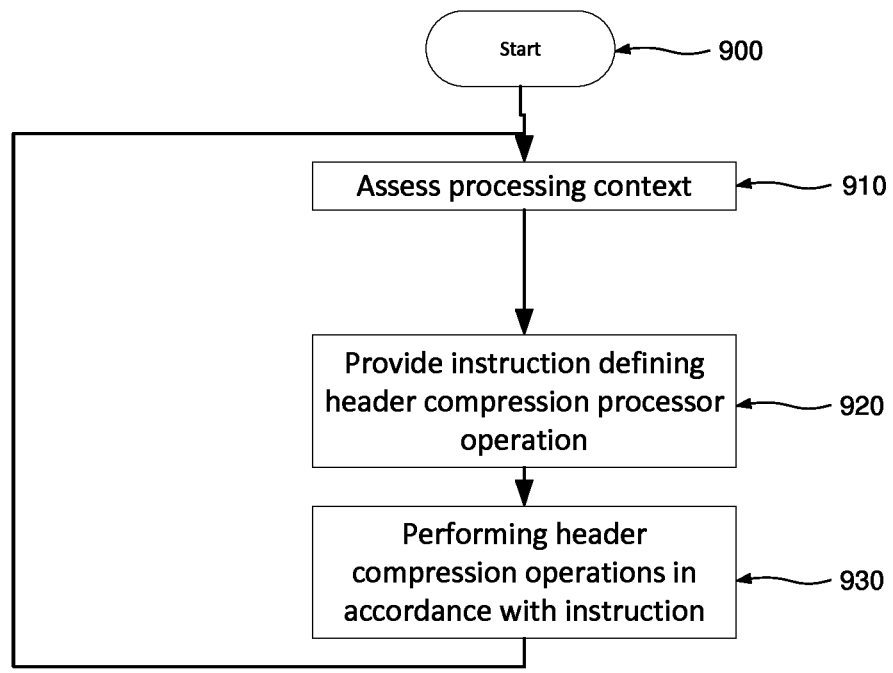
FIG. 9 shows a method in accordance with an embodiment.

FIG. 9 shows a method of header processing in a system comprising a context memory storing a plurality of rules, each said rule comprising one or more field instructions, each said field instructions comprising a target value and a processing instruction, for example as described with respect to FIG. 1. The header compression processor may be adapted to determine for each rule whether a respective specified region of a data message corresponds to a target value in a respective prescribed manner, and in a case where said respective specified region corresponds to said target value in said respective prescribed manner for each field instruction line in a respective rule, applying the processing instruction of each field instruction line in said corresponding rule with regard to the respective specified region, wherein the data component processed is defined by the processing instruction.

This header compression processor may be adapted to operate along the following lines. The header compression processor initially awaits a data message. Once it is determined that a new data message has been received a first rule is selected for assessment. The first instruction line of the currently selected rule is considered for assessment. If the specified region of the data message corresponds to the target value in a first respective prescribed manner, e.g. if the field value matches the target value, it is determined whether the instruction line currently under consideration is the last. In a case where it is determined that the instruction line currently under consideration is the last it is determined whether the rule currently under consideration is the last. In a case where it is determined that the rule currently under consideration is the last the method processes the data packet in accordance with the matching rule in the usual way as discussed with reference to FIG. 1. In a case where it is determined that the instruction line currently under consideration is not the last the method proceeds to select the next instruction line before proceeding for that instruction as described above. In a case where it is determined that the rule currently under consideration is not the last the next rule is selected before proceeding for that rule as described above. In this way the processor loops through all fields of all rules in order to find the matching rule as discussed with reference to FIG. 1. The skilled person will appreciate that the processor may operate in a wide range of alternative ways in order to implement the mechanism of FIG. 1.

As shown in FIG. 9, the method starts at step 900 before proceeding to step 910 at which a processing context is assessed. As discussed above, the processing context may comprise any available data relevant to the performance of the header compression processor. The method next proceeds to step 920 at which one or more instructions defining the operation of the header compression processor are provided as a function of the processing context. As described above, the instructions may be issued to any element of a header processing system, including for example a header processor, state memory, context memory, or dispatcher. The instructions may be such as to optimise or improve the behaviour of the header compression processor in view of the processing context as discussed above. For example, the instruction may cause a change in the compression of certain types of data. The method then proceeds to step 930 at which one or more header compression operations are performed in accordance with the instruction. As discussed above, the may involve processing rules in a sequence defined by the instruction, the processing of new or modified rules, the processing of rules with regard to modified status values, and so on.

By this means, a flexible, dynamic and reactive processing of data streams is provided.

Optionally, as discussed above, one or more of the instructions may be provided to the processor, wherein the one or more instructions define priorities determining the sequence in which the header compression processor determines for each rule whether a respective specified region of a data message corresponds to the target value in a respective prescribed manner, as a function of the processing context.

Optionally, as discussed above, the instruction to the processor defining priorities disallows one or more rules from the process of determining.

Optionally, as discussed above, one or more the instructions may be provided to the context memory to modify the content thereof.

Optionally, as discussed above, the method may comprise the further steps of generating a new rule, and providing one or more instructions to the context memory to modify the content thereof by adding the new rule thereto.

Optionally, as discussed above, a rule may be modified by modifying the target value or field instruction line of that rule in said context memory.

Optionally, as discussed above, a rule may be modified by deleting a said rule from said context memory.

Optionally, as discussed above, the instructions to said context memory to modify the content thereof may be generated with regard to historical content of said data message, where said new or modified rule provides a compression operation optimized for said historical content.

Optionally, as discussed above, where the system comprises a state memory, and wherein one or more said rules have regard to a value stored in said state memory, the one or more said instructions may be provided to the state memory to set said value.

Optionally, as discussed above, the processing context may comprise a value in said state memory.

Optionally, as discussed above, where the system comprises a dispatcher, one or more said instructions may be provided to said dispatcher causing said dispatcher to transmit a said rule or element of the header processing system.

Accordingly, as described above a rule based header compression system such as a SCHC compressor/decompressor may comprise a controller which provides "hints" to the header compression processor, so as to direct its behaviour. These hints may define new rules, modify existing rules, set state values against which rules are tested during compression, prioritise rules or exclude rules from consideration to achieve optimum compression. The controller may dynamically generate rules on the basis of learned of detected flow characteristics to achieve optimum compression. The controller may operate as a state machine, which may define states corresponding to different degrees of compression for a given flow or flow type. The system comprises multiple compressors, some or all of which may be remote from the compression processor.

The skilled person will appreciate that embodiments, including certain of those presented above, may be implemented by means of software code.

Software embodiments include but are not limited to application, firmware, resident software, microcode, etc. The invention can take the form of a computer program product accessible from a computer-usable or computer-readable medium providing program code for use by or in connection with a computer or an instruction execution system. Software embodiments include software adapted to implement the steps discussed above with reference to FIG. 9. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a drone, a computer or any other device with processing capability, such as a robot or other connected device, including IoT (Internet of Things) devices.

Figure 10:
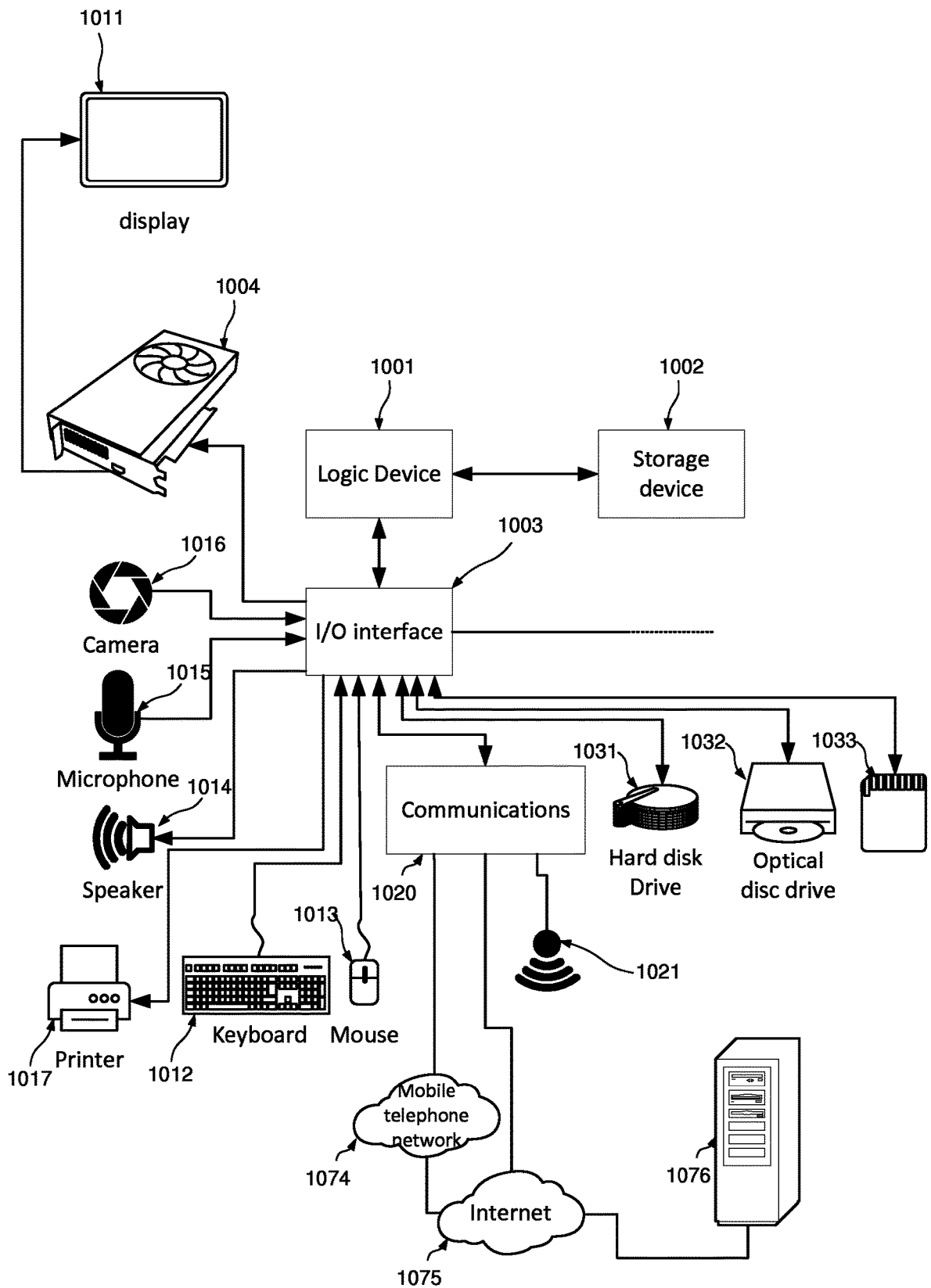
FIG. 10 shows a generic computing system suitable for implementation of embodiments of the invention.

FIG. 10 shows a generic computing system suitable for implementation of embodiments of the invention.

A shown in FIG. 10, a system includes a logic device 1001 and a storage device 1002. The system may optionally include a display interface 1004 and display 1011, input/output subsystem 1003, communication subsystem 1020, and/or other components not shown.

Logic device 1001 includes one or more physical devices configured to execute instructions. For example, the logic device 1001 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 1001 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 1001 optionally may be distributed among two or more separate devices, which may be remotely located and/or configured for coordinated processing. Aspects of the logic device 1001 may be virtualized and executed by remotely accessible, networked computing devices configured in a cloud-computing configuration.

Storage device 1002 includes one or more physical devices configured to hold instructions executable by the logic device to implement the methods and processes described herein. When such methods and processes are implemented, the state of storage 1002 device may be transformed—e.g., to hold different data.

Storage device 1002 may include removable and/or built-in devices. Storage device may be locally or remotely stored (in a cloud for instance). Storage device 1002 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 1003 adapted to support communications between the logic device 1001 and further system components. For example, additional system components may comprise removable and/or built-in extended storage devices. Extended storage devices may comprise one or more types of storage device including optical memory 1032 (e.g., CD, DVD, HD-DVD, Blu-Ray Disc, etc.), semiconductor memory 1033 (e.g., RAM, EPROM, EEPROM, FLASH etc.), and/or magnetic memory 1031 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 1001 and storage device 1002 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device 1002. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 10 may be used to implement embodiments of the invention.

For example a program implementing the steps described with respect to FIG. 9, or the algorithms presented above may be stored in storage device 1002 and executed by logic device 1001. The data message and/or data component may be received and/or transmitted via the communications interface 1020, and in particular via radio network 1074 or the internet 1075. The Context or individual specifications may be received and/or transmitted via the communications interface 1020, and in particular via radio network 1074 or the internet 1075. The data message, and/or data component may be buffered or otherwise stored in storage device 1002, 1031, 1032, 1033. The Context or individual specifications may be stored in storage device 1002, 1031, 1032, 1033. The data message, and/or data component may be User The functions of any or all of the units 210, 220, 230, 340, 450, or any or all of their respective sub units, may similarly be implemented by a program performing the required functions, in communication with additional dedicated hardware units as necessary. Accordingly the invention may be embodied in the form of a computer program.

It will be appreciated that a "service", as used herein, is an application program executable across multiple user sessions. A service may be available to one or more system components, programs, and/or other services. In some implementations, a service may run on one or more server-computing devices.

When included, display subsystem 1011 may be used to present a visual representation of data held by a storage device. This visual representation may take the form of a graphical user interface (GUI). As the herein described methods and processes change the data held by the storage device 1002, and thus transform the state of the storage device 1002, the state of display subsystem 1011 may likewise be transformed to visually represent changes in the underlying data. Display subsystem 1011 may include one or more display devices utilizing virtually any type of technology for example as discussed above. Such display devices may be combined with logic device and/or storage device in a shared enclosure, or such display devices may be peripheral display devices. An audio output such as speaker 1014 may also be provided.

When included, input subsystem may comprise or interface with one or more user-input devices such as a keyboard 1012, mouse 1013, touch screen 1011, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone 1015 for speech and/or voice recognition; an infrared, colour, stereoscopic, and/or depth camera 1016 for machine vision and/or gesture recognition; a head tracker, eye tracker, accelerometer, and/or gyroscope for motion detection and/or intent recognition; as well as electric-field sensing componentry for assessing brain activity. The input/output interface 1003 may similarly interface with a loudspeaker 1014, vibromotor or any other transducer device as may occur to the skilled person. For example, the system may interface with a printer 1017.

When included, communication subsystem 1020 may be configured to communicatively couple computing system with one or more other computing devices. For example, communication module of communicatively couple computing device to remote service hosted for example on a remote server 1076 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 1074, or a wired or wireless local- or wide-area network. In some embodiments, the communication subsystem may allow computing system to send and/or receive messages to and/or from other devices via a network such as Internet 1075. The communications subsystem may additionally support short range inductive communications with passive or active devices (NFC, RFID, UHF, etc). In certain variants of the embodiments described above, the traffic data may be received via the radio network 1074 or Internet 1075.

The system of FIG. 10 is intended to reflect a broad range of different types of information handling system. It will be appreciated that many of the subsystems and features described with respect to FIG. 10 are not required for implementation of the invention, but are included to reflect possible systems in accordance with the present invention. It will be appreciated that system architectures vary widely, and the relationship between the different sub-systems of FIG. 10 is merely schematic, and is likely to vary in terms of layout and the distribution of roles in systems. It will be appreciated that, in practice, systems are likely to incorporate different subsets of the various features and subsystems described with respect to FIG. 10.

Examples of devices comprising at least some elements of the system described with reference to FIG. 10 and suitable for implementing embodiments of the invention include cellular telephone handsets including smart phones, and vehicle navigation systems, distributed sensors, smart domestic appliances, connected industrial infrastructure equipment Smart city implementations or components, smart energy consumption implementations or components, finding articles or persons, medical, emergency services, agriculture, wearable sensors for humans and other species and so on.

Figure 11:
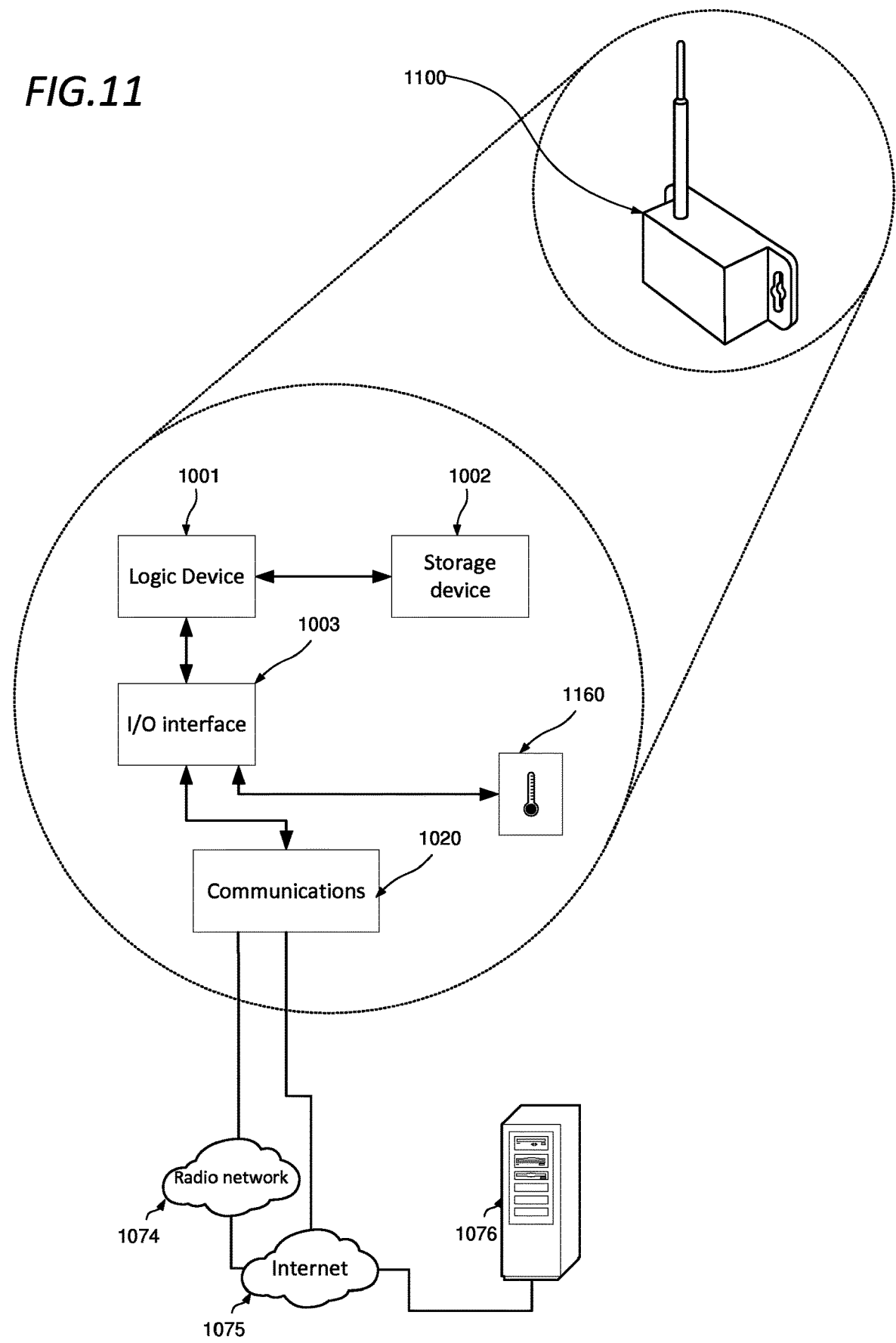
FIG. 11 shows a standalone sensor device adaptable to constitute an embodiment.

FIG. 11 shows a standalone sensor device adaptable to constitute an embodiment. The standalone sensor device 1100 of FIG. 11 may represent a typical "Internet of Things" component. Such devices are often subject to significant constraints in terms of communications bandwidth, power consumption, processing and memory capacity, and as such may benefit from many of the mechanisms presented in the foregoing discussion. As shown in FIG. 10, the standalone sensor device incorporates elements 1001, 1002, 1003, 1020 as described above, and sensor device 1160. It is in communication with the radio network 1074 and a server 1076 via the network 1075. Alternative communication mechanisms such as a dedicated network or Wi-Fi may also be used.

As shown the sensor device is a temperature sensor, however it will be appreciated that it might equally embody any other type of sensor, or other transducer, or a plurality of transducers as appropriate to the role of the device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A header processing system comprising:
a context memory storing a plurality of rules, each said rule comprising one or more field instructions, each said field instructions comprising a target value and a processing instruction;
a header compression processor adapted to determine for each said rule whether a respective specified region of a data message corresponds to said target value in a respective prescribed manner, and in a case where said respective specified region corresponds to said target value in said respective prescribed manner for each field instruction line in a respective said rule, applying the processing instruction of each field instruction line in a corresponding rule with regard to the respective specified region, wherein a data component processed is defined by said processing instruction,
said header processing system further comprising a controller, said controller being adapted to assess a processing context, and to provide one or more instructions defining an operation of said header compression processor as a function of said processing context,
wherein said data message belongs to one of a plurality of data flows processed by said header processing system, and said processing context comprises an identity of a data flow to which said data message belongs, and
wherein said controller is adapted to determine that available compression rules in the context memory are not well suited to characteristics of an incoming stream, to generate a new rule with regard to historical content of said data message, where said new rule or modified rule provides a compression operation optimized for said historical content, and to provide one or more said instructions to said context memory to modify the content thereof by adding said new rule thereto.

2. The header processing system of claim 1, wherein one or more said instructions are provided to said header compression processor, and wherein said one or more instructions define priorities determining a sequence in which said header compression processor determines for each said rule whether a respective specified region of a data message corresponds to said target value in a respective prescribed manner, as a function of said processing context.

3. The header processing system of claim 2, wherein said instruction to said processor defining priorities disallows one or more said rules from said process of determining.

4. The header processing system of claim 1, wherein said controller is adapted to modify a said rule by modifying the target value or field instruction line of said rule in said context memory.

5. The header processing system of claim 1, further comprising a state memory, wherein one or more said rules have regard to a value stored in said state memory, and wherein one or more said instructions are provided to said state memory to set said value.

6. The header processing system of claim 1, further comprising a dispatcher, said dispatcher receiving output of said header compression processor for onward transmission.

7. The header processing system of claim 6, wherein said dispatcher receives an instruction from said controller, said controller being further adapted to cause said dispatcher to transmit a said rule or element thereof.

8. The header processing system of claim 6, wherein said dispatcher is further adapted to provide feedback to said controller.

9. The header processing system of claim 8, wherein said feedback comprises a length of each compressed message output by said header compression processor.

10. The header processing system of claim 1 wherein said controller is implemented as an Artificial Intelligence machine.

11. The header processing system of claim 10 wherein said Artificial Intelligence machine is a neural network.

12. The header processing system of claim 10 wherein said Artificial Intelligence machine is an evolutive state machine.

13. The header processing system comprising a plurality of controllers as defined in claim 1.

14. A method of header processing, in a system comprising a context memory storing a plurality of rules, each said rule comprising one or more field instructions, each said field instructions comprising a target value and a processing instruction;
a header compression processor adapted to determine for each said rule whether a respective specified region of a data message corresponds to said target value in a respective prescribed manner, and in a case where said respective specified region corresponds to said target value in said respective prescribed manner for each field instruction line in a respective said rule, applying the processing instruction of each field instruction line in a corresponding rule with regard to the respective specified region, wherein a data component processed is defined by said processing instruction,
said method comprising:
assessing a processing context,
providing one or more instructions defining an operation of said header compression processor as a function of said processing context, and
performing one or more header compression operations in accordance with said instruction,
wherein said data message belongs to one of a plurality of data flows processed by said header processing system, and said processing context comprises an identity of a data flow to which said data message belongs, and wherein a controller is adapted to determines that available compression rules in the context memory are not well suited to characteristics of an incoming stream to generate a new rule with regard to historical content of said data message, where said new rule or modified rule provides a compression operation optimized for said historical content, and to provide one or more said instructions to said context memory to modify the content thereof by adding said new rule thereto.

15. A non-transitory computer readable medium comprising instructions adapted to implement the method of claim 14.

* * * * *